Patented July 10, 1934

1,966,168

UNITED STATES PATENT OFFICE 1,966,168

PROCESS FOR RAISING THE MELTING POINT OF MONTAN WAX

Otto Eberhardt, Karlsbad, Czechoslovakia, assignor to A. Riebeck'sche Montanwerke Aktiengesellschaft, Halle-on-the-Saale, Germany No Drawing. Application September 24, 1931, Serial No. 564,988. In Germany October 23, 1930

6 Claims. (Cl. 87—19)

It is already known to raise the melting point of Montan wax by heating Montan wax or bitumen for a long time under pressure with lime or baryta. The treatment of bitumen having a melting point of 84–90° by this known method, 5% lime and water being used, the treatment lasting for fourteen hours under pressure, yielded a product the melting point of which exceeded 100°. It has now been found, and this could not be foreseen, that this bothersome treatment which lasts a long time and has to be carried out under pressure and which substantially raises the ash content of the bitumen far above the quantity usual in commerce and which extensively changes the chemical structure and properties of the usual Montan wax of commerce is not necessary for raising the melting point of the Montan wax, but the melting point of the wax may be substantially raised within a short time by using small quantities, up to about 1%, of metal hydroxides, basic-acting metal oxides or basic-acting metal carbonates, e. g. calcium hydroxide, the heating being effected to temperatures not exceeding 200° C. Whereas, in the known process, after fourteen hours treatment under pressure, using 5% lime, the melting point was raised by 16°, according to the present process, using small quantities of calcium hydroxide (0.2%) an elevation of the melting point of 5° was produced within half an hour. Comparison of these figures shows the substantial advantage which is possessed by the new process over that heretofore known.

Further experiments have shown that it is not essential to use fused Montan wax, but that the melting point of the wax is raised by treatment of the latter dissolved in organic solvents with metal hydroxides, basic-acting metal oxides or basic-acting metal carbonates or mixtures thereof in presence of water. It has been found that it is not necessary to use pressure in this treatment but that the process can also be carried out under pressure.

It is not necessary, therefore, first of all to melt the Montan wax for this treatment, but the latter may be carried out in the course of the manufacturing process (extraction of Montan wax from brown coal with solvents and evaporation of the solvent) without the operation being interrupted. The Montan wax solution running off in the extraction (benzene, benzine, alcohols, esters, ketones or mixtures thereof and so forth) is mixed with a suitable quantity of hydroxides before complete removal of the solvent; good results are also obtained if the metal hydroxides and so forth are not introduced into the solution but are already added to the coal prior to the extraction.

In this process also operations are carried out with small quantities, e. g. 0.2% of calcium hydroxide, and care is taken to ensure a uniform distribution. After half an hour treatment the melting point of the Montan wax is raised by about 5°.

Examples

1. Crude Montan wax with a melting point of 80° is fused. 0.2% of calcium hydroxide suspension is added to fused wax whilst continuously stirring, the temperature being slowly raised up to 90°. Stirring is continued at this temperature for about half an hour. In this way the melting point of the Montan wax is raised to 85°.

2. Crude Montan wax having a melting point of 80° is fused and 0.2% of calcium hydroxide is introduced at a temperature above 100° whilst continuously stirring until uniform distribution has taken place. After about half an hour treatment the melting point of the wax was raised to 85°.

3. Crude Montan wax solution obtained in the course of manufacture is mixed with 0.2% of calcium hydroxide, care being taken that uniform distribution takes place. After the hydroxide had acted for about half an hour the melting point of the wax raised about 5°.

What I claim is:

1. A process for raising the melting point of crude or treated Montan wax comprising subjecting the wax for a short time to temperatures not exceeding 200° C. in presence of water and up to about 1% of a substance selected from the group consisting of alkaline earth metal hydroxides, alkaline earth metal oxides and alkaline earth metal carbonates, whereby a wax product is obtained having the same physical characteristics as the original wax.

2. A process for raising the melting point of crude or treated Montan wax comprising subjecting the wax for a short time under raised pressure to temperatures not exceeding 200° C. in presence of water and up to about 1% of a substance selected from the group consisting of alkaline earth metal hydroxides, alkaline earth metal oxides and alkaline earth metal carbonates, whereby a wax product is obtained having the same physical characteristics as the original wax.

3. A process for raising the melting point of crude or treated Montan wax comprising subjecting the fused wax for a short time to temperatures not exceeding 200° C. in presence of water and up to about 1% of a substance selected from the group consisting of alkaline earth metal hydroxides, alkaline earth metal oxides and alkaline earth metal carbonates, whereby a wax product is obtained having the same physical characteristics as the original wax.

4. A process for raising the melting point of crude or treated Montan wax comprising subjecting a solution of the wax in an organic solvent for a short time to temperatures not exceeding 200° C. in presence of water and up to about 1% of a substance selected from the group consisting of alkaline earth metal hydroxides, alkaline earth metal oxides and alkaline earth metal carbonates, whereby a wax product is obtained having the same physical characteristics as the original wax.

5. In the process of extracting Montan wax from coal the step of adding to the latter prior to the extraction up to about 1% of a substance selected from the group consisting of alkaline earth metal hydroxides, alkaline earth metal oxides and alkaline earth metal carbonates, whereby a wax product of increased melting point is obtained having physical characteristics no different from those of the wax obtained by extraction of the coal in the absence of said added substance.

6. A process for raising the melting point of crude or treated Montan wax comprising subjecting the wax for a short time to temperatures not exceeding 200° C. in presence of water and up to about 1% of calcium hydroxide, whereby a wax product is obtained having the same physical characteristics as the original wax.

OTTO EBERHARDT.